(12) United States Patent
Travisano

(10) Patent No.: US 10,911,812 B2
(45) Date of Patent: Feb. 2, 2021

(54) SYSTEM AND METHOD FOR DELIVERY OF NEAR-TERM REAL-TIME RECORDED VIDEO

(71) Applicant: S2 Security Corporation, Framingham, MA (US)

(72) Inventor: Michael D. Travisano, Carlisle, MA (US)

(73) Assignee: S2 Security Corporation, Framingham, MA (US)

(*) Notice: Subject to any disclaimer, the term of this patent is extended or adjusted under 35 U.S.C. 154(b) by 27 days.

(21) Appl. No.: 15/921,853

(22) Filed: Mar. 15, 2018

(65) Prior Publication Data

US 2019/0090006 A1 Mar. 21, 2019

Related U.S. Application Data

(60) Provisional application No. 62/559,744, filed on Sep. 18, 2017.

(51) Int. Cl.
| | | |
|---|---|---|
| *H04N 21/2662* | (2011.01) | |
| *H04N 21/2343* | (2011.01) | |
| *H04N 21/2187* | (2011.01) | |
| *H04N 7/18* | (2006.01) | |
| *H04N 21/238* | (2011.01) | |

(52) U.S. Cl.
CPC ........ *H04N 21/2662* (2013.01); *H04N 7/181* (2013.01); *H04N 21/2187* (2013.01); *H04N 21/23805* (2013.01); *H04N 21/234381* (2013.01); *H04N 7/188* (2013.01)

(58) Field of Classification Search
None
See application file for complete search history.

(56) References Cited

U.S. PATENT DOCUMENTS

| | | |
|---|---|---|
| 5,625,410 A | 4/1997 | Washino et al. |
| 5,982,418 A | 11/1999 | Ely |
| 6,374,356 B1 | 4/2002 | Daigneault et al. |
| 6,421,080 B1 | 7/2002 | Lambert |
| 6,422,463 B1 | 7/2002 | Flink |
| 6,476,858 B1 | 11/2002 | Ramirez Diaz et al. |
| 6,625,812 B2 | 9/2003 | Abrams et al. |
| RE43,462 E | 6/2012 | Washino et al. |
| 8,270,487 B1* | 9/2012 | Kizhepat ........ H04N 21/234309 375/240.12 |
| 9,918,045 B1 | 3/2018 | Moss et al. |
| 2002/0063799 A1* | 5/2002 | Ortiz ................. H04N 5/44 348/559 |
| 2006/0026495 A1 | 2/2006 | Shaw |
| 2007/0296854 A1* | 12/2007 | Berkey ............. H04N 19/172 348/412.1 |
| 2008/0278604 A1* | 11/2008 | Watkins ............ H04N 21/235 348/231.2 |

(Continued)

*Primary Examiner* — Frederick D Bailey
(74) *Attorney, Agent, or Firm* — Armis IP Law, LLC

(57) ABSTRACT

A system and method for delivery of near-term real-time recorded video includes a byte stream server to provide streaming video from a server platform for video that is being simultaneously recorded to files. The video can be delivered at programmable rates, including faster than real-time, real-time, and slower than real-time. The delivered video can include all video frames, or only I-frames/Key-frames.

20 Claims, 3 Drawing Sheets

(56) References Cited

U.S. PATENT DOCUMENTS

| | | | |
|---|---|---|---|
| 2009/0080864 A1* | 3/2009 | Rajakarunanayake | H04N 5/76 |
| | | | 386/200 |
| 2009/0119734 A1* | 5/2009 | Deshpande | H04N 7/17318 |
| | | | 725/118 |
| 2010/0095335 A1 | 4/2010 | Wilson | |
| 2013/0305297 A1* | 11/2013 | Jabara | H04N 21/2365 |
| | | | 725/75 |
| 2013/0332856 A1 | 12/2013 | Sanders | |
| 2015/0077553 A1* | 3/2015 | Dawes | H04L 12/2809 |
| | | | 348/143 |
| 2015/0327114 A1 | 11/2015 | Gupta | |
| 2016/0314762 A1 | 10/2016 | Lee | |
| 2016/0321104 A1* | 11/2016 | Fang | G06F 9/4881 |
| 2016/0366118 A1 | 12/2016 | Wang | |
| 2017/0094328 A1 | 3/2017 | Herrmann | |
| 2018/0205906 A1* | 7/2018 | Boyle | G11B 27/031 |
| 2018/0255332 A1* | 9/2018 | Heusser | H04N 21/242 |
| 2019/0238933 A1* | 8/2019 | Di | H04N 21/4728 |

* cited by examiner

SYSTEM AND METHOD FOR DELIVERY OF NEAR-TERM REAL-TIME RECORDED VIDEO

RELATED APPLICATIONS

This application claims the benefit of U.S. Provisional Application No. 62/559,744 filed Sep. 18, 2017, entitled SYSTEM AND METHOD FOR DELIVERY OF NEAR-TERM REAL-TIME RECORDED VIDEO which application is hereby incorporated herein by reference in its entirety.

FIELD OF THE INVENTION

This invention relates generally to security systems, surveillance and more particularly to networked video systems and streaming video.

BACKGROUND OF THE INVENTION

In security and access control applications, video capabilities are an important feature at access points in an individual office or a facility including one or more buildings and at residences. The installation of cameras and display monitors, the addition of new features and the operation of conventional systems is often complicated by the use of various incompatible communications channels required by the individual systems. Managing the configuration of cameras and display monitors which are often remote from one another is complicated in conventional systems. Delivering near-term real-time recorded video from a large number of video sources on demand is not easily accomplished.

On video recording servers that support recording of a large number of simultaneous camera feeds, it is not possible, due to memory limitations, to provide a delayed buffering scheme or queuing scheme for every camera in the server's recording pipeline. This is particularly relevant for high definition (HD) cameras, where 30 seconds of video buffering could comprise approximately 60 MB of random access memory (RAM), assuming a compressed video data rate of 16 Mbps. For a server that is supporting hundreds of concurrent camera connections and recordings, the memory required to buffer all video streams for just 30 seconds of immediate access and playback by an external entity (video playback client, e.g.) would be prohibitively large (e.g., 6 GB of RAM for each of 100 HD cameras totaling more than a half a terabyte of RAM memory). Additionally it is difficult to gain immediate access to video frames on a server for playback without having to buffer the video frames in memory.

The current state of the art is to generally use a circular queue to buffer a small amount of data for each stream—this limits the total number of streams possible to buffer, as well as the amount of frames (or time) possible to buffer for each stream or a select number of streams. Another conventional approach is to use very small (on the order of 2-5 seconds) recorded media files. This has complexities inherent in the approach, such as the server having to manage and index a large number of files as well as the file system churn of opening and closing a substantially large number of video recording files, particularly when the simultaneous camera count is high. The client mechanism is complex as well, as it needs to download or progressively download a large number of recorded files, as well as manage and play back the downloaded file-based media.

It would, therefore, be desirable to provide a system which will allow immediate access to all past video frames in time (including a small time delta) of any and all camera feeds being recorded on a video server.

SUMMARY OF THE INVENTION

Embodiments described herein provide methods for streaming video from a server platform while the video is being simultaneously recorded to files. The video can be delivered at programmable rates, including faster than real-time, real-time, and slower than real-time. The delivered video can include video frames, or only I-frames/Keyframes. Frames that are actively being recorded to a video file container can be accessed for immediate decode and playback by an external client without having to buffer the frames in memory.

The methods described herein will allow almost immediate access to all past video frames of camera feeds being recorded on a video server with only a small time delay. Frames that are actively being recorded to a video file container can be accessed for decode and playback by an external client without having to buffer the frames in memory.

Embodiments described herein include system for delivery of near-term real-time recorded video including a byte stream server having a network interface, at least one client worker thread coupled to the byte stream server, a time-based file search engine coupled to the at least one client worker thread, at least one file frame mapper-indexer coupled to the at least one client worker thread, a video and index file storage system for storing video and index files coupled to the at least one file frame mapper-indexer, an encapsulater coupled to the at least one file frame mapper-indexer and the video and index file storage system and a client playback subsystem coupled to the at least one client worker thread and to the network interface. With such an arrangement, programmable delivery frequency, auto-continuation, Iframe only and configurable frame periodicity delivery modes are provided. This is accomplished without requiring large RAM memory buffers and only uses a single re-usable frame buffer of memory, and minimal resources (e.g., small amount of disk I/O, and small amount of CPU).

In one embodiment, a technique to method to deliver near-term real-time recorded video includes receiving a byte stream request including a time search criterion from a playback requester, initiating a client worker thread corresponding to the received byte stream request, searching video and index files to find frames corresponding to the time search criterion; mapping and encapsulating the searched and found frames and transmitting the encapsulated frames to the playback requester. Such a method facilitates access and play back video almost immediately (i.e., a very short delay) upon an event occurring at a specific time in the near past (generally 2-7 seconds in the near past) for any camera source being recorded. This also allows the playback of near-term video to be continually accessed toward a time of "now."

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the systems and methods for delivery of near-term real-time recorded video can be embodied strictly as a software program, as software and hardware, or as hardware alone such as within a single processor or multiple processors, or within an operating system or within a software application. One embodiment includes a computer-readable non-transitory storage medium having instructions stored thereon for processing data information, such that the instructions, when carried out by a processing device, enable the processing device to perform operations of: receiving a byte stream request including a time search criterion from a playback requester, initiating a client worker thread corresponding to the received byte stream request, searching video and index files to find frames corresponding to the time search criterion; mapping and encapsulating the searched and found frames and transmitting the encapsulated frames to the playback requester.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION OF THE INVENTION

In embodiments described herein a byte stream server solves the problem of how to gain immediate access to video frames on a server for playback without having to buffer the video frames in random access memory.

Figure 1:
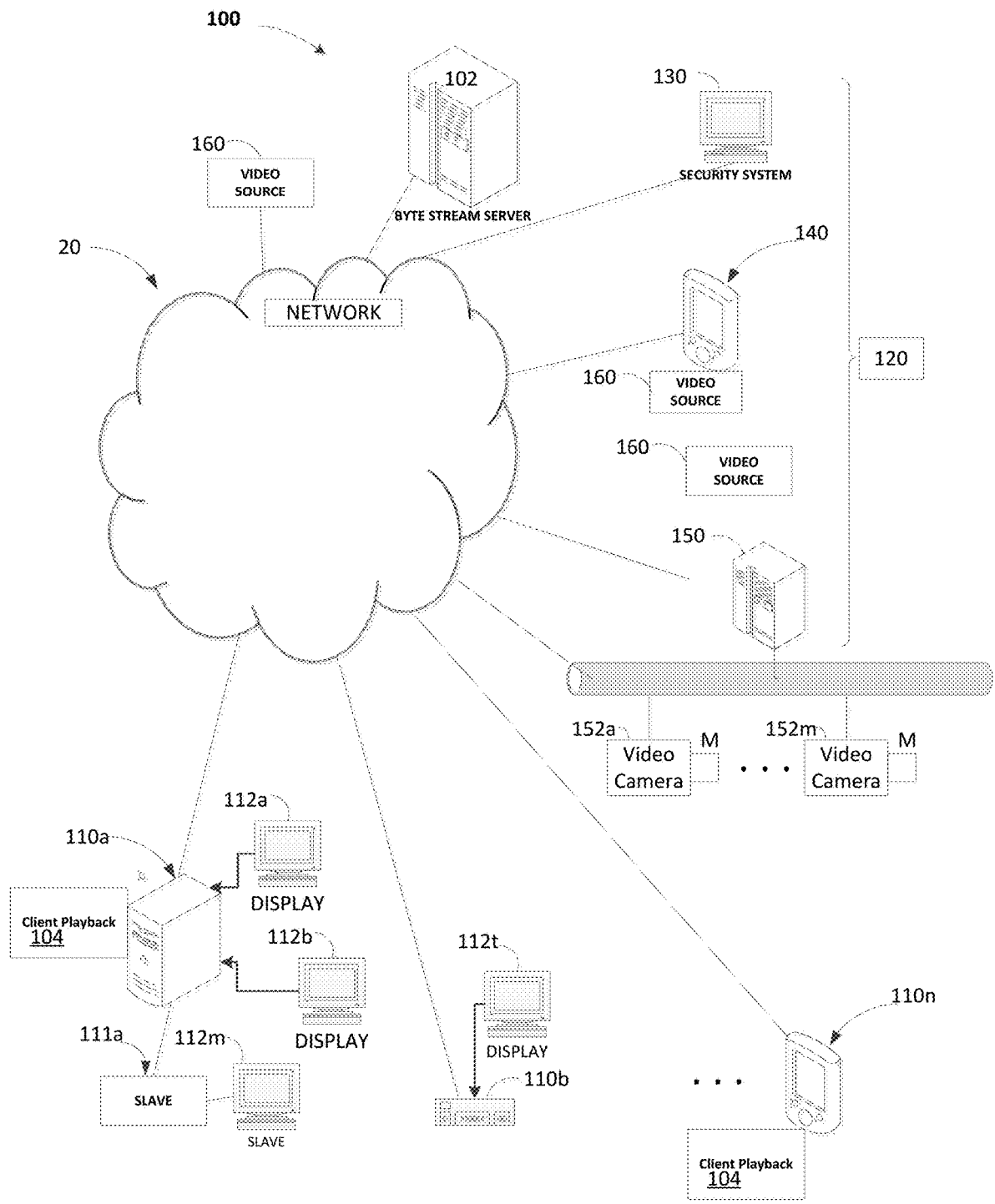
FIG. 1 is a schematic block diagram of a byte stream server operating in an integrated security system including networked monitor appliances and networked monitor controllers according to one embodiment disclosed herein.

Now referring to FIG. 1, an exemplary system 100 for delivery of near-term real-time recorded video includes a byte stream server (BSS) 102 having a network interface and a client playback subsystem 104. The byte stream server operates in an environment which includes networked monitor controllers 120 (also referred to as NMA controller) and networked monitor appliances 110a-110n (generally referred to as NMA 110). The NMA controller 120 includes, but is not limited to a global or local security control system 130, a mobile device 140 (with or without a camera) running a mobile application, a forensic desktop system and a digital video recording system (DVR) 150 which can be directly hard wired to cameras or controlling cameras over a network. The DVR 150 and mobile device 140 can be both an NMA controller 120 and a video source 160. The NMA 110 includes, but is not limited to, a personal computer, a set-top box and a mobile device. The NMA 110 can be connected to a display 112 and optionally more than one display (e.g., display 112b). The NMA 110 generally maintains a rectangular bitmap display on the display 112. In one embodiment, the NMA 110 includes a client app for use on a personal computer (PC) including one or more separate displays 112a-112b. In another embodiment, the NMA 110 is available as an application on a dedicated set-top box with one or more displays. In still another embodiment, the NMA 110 is available as an app running on a mobile device operating system (e.g., iOS or Android) with an integrated display. The client playback subsystem 104 to request and receive BSS transmitted frames includes the deserialization (or framing) of the video frames from the received stream of bytes received from the BSS 102.

In general, the BSS 102 does not take the place of the fully functional DVR 150, but in certain embodiments the BSS 102 an important enhancement to the DVR 150. If the DVR 150 is configured to record live streams with a requirement to deliver frames at any time during the recording before the DVR 150 commits the live frames to file storage, the BSS 102 could offer this functionality, as long as the temporary storage mechanism in the DVR is file based. Live video can be acquired from crowd sourced video, a video recorder, an IP camera, IP-based video source and external video. If the frames of video were being stored in a file based memory map before being committed via the disk I/O subsystem to a file/container, the BSS could be used to index into that memory as well to deliver video frames. In that embodiment, the search engine would search and return an ascending time-ordered list of memory maps for the video frames and associated metadata. The BSS 102 can operate in conjunction with other types of video servers in addition to DVRs. These video servers are also sourced with video from IP-based video cameras, and the BSS 102 can operate in conjunction with these servers.

Figure 2:
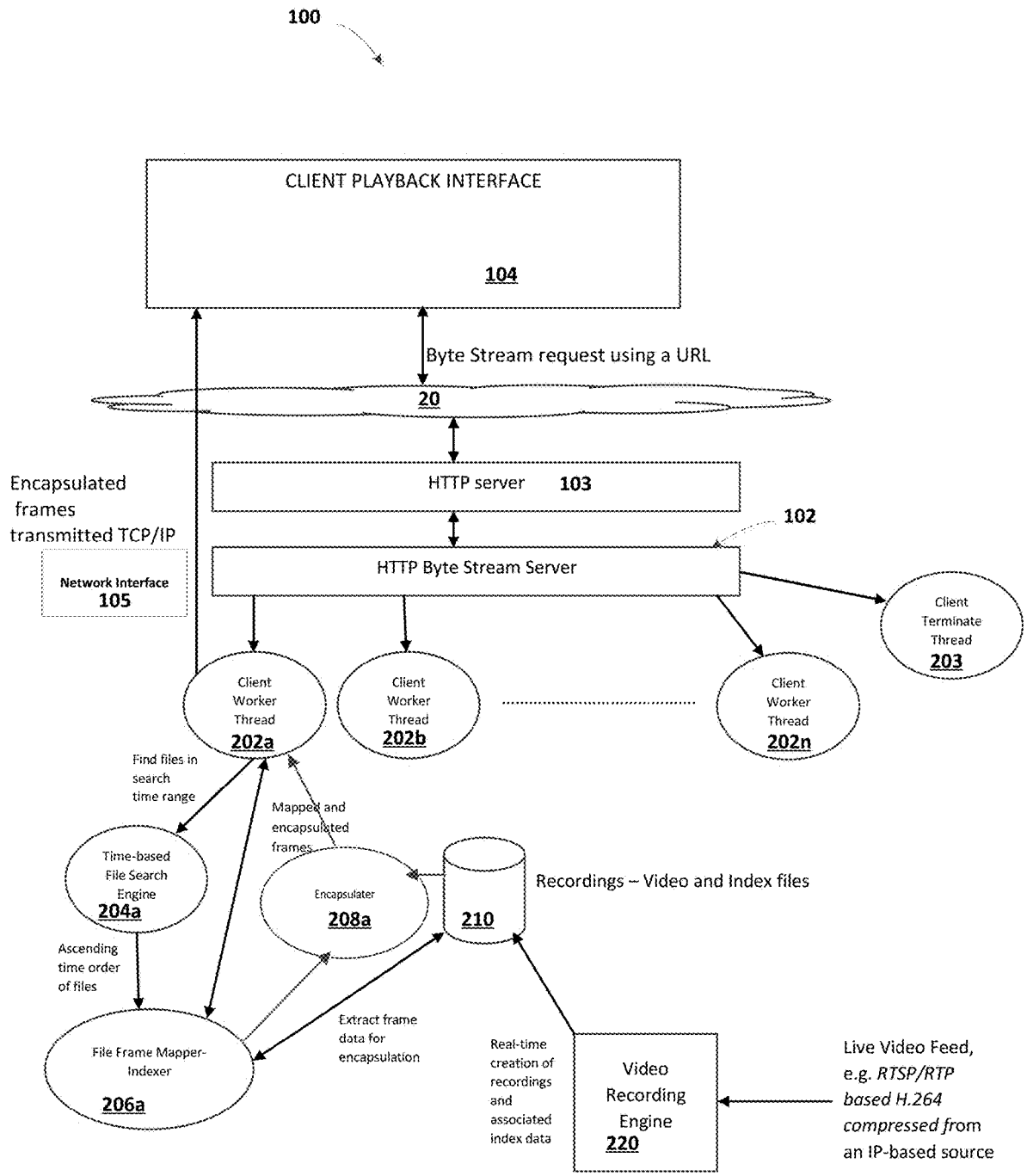
FIG. 2 is a block diagram of the byte stream server and client playback system of FIG. 1.

Now referring to FIG. 2, the byte stream server 102 includes a network interface 105 and in operation initiates multiple instances client worker threads (CWT) 202a-202n (generally referred to as CWT 200) in response to byte stream requests from users through also client playback subsystem 104. The byte stream server 102 and the CWT 202 initiate a time-based search engine 204a (referred to as time-based search engine 204) and a file frame mapper-indexer 206a (referred to as file frame mapper-indexer 206) coupled to a video and index file storage system 210 and an encapsulater 208a (referred to as encapsulater 208) coupled to at least one file frame mapper-indexer 206 and the video and index file storage system 210. The system 100 further includes a client worker thread terminator 203 and a video recording engine 220 coupled to the video and index file storage system 210. In one embodiment, video frames are recorded in a video and index file storage system. In a further embodiment, a frame index entry is recorded in the video and index file storage system.

The delivery of near-term real-time recorded video process used to retrieve frames of video from any time in the past, even the recent past (e.g. 1-2 seconds in the past from the current time) includes indexing into the stored video files and retrieving frame data precisely from the file containers using the index data. The frames can be efficiently read out of the file containers and encapsulated in a format for transmission using the standard TCP/IP protocol (via standard socket programming). The encapsulation includes a start code, the frame data, any additional data that can help with the playback (e.g., frame number, PTS value, etc), and a stop code. At the receive side, the receiver will use the encapsulation parameters to "frame" the data from the received byte stream, and extract the video frames for playback (or other frame processing).

An external client can retrieve the frames using http protocol access. The frame indexing and transmission is executed as part of the handling of this external http request. In one embodiment request directed to a URL address can include the following optional parameters:

autocontinue=true/false (default=false)
    iframeonly=true/false (default=false)
    transferrate=<rate>(default is 20 msec per frame)

Throttling (or the frequency of frame transmission) is accomplished by delaying a settable amount between each frame encapsulation and transmission. The frequency of frame transmission can be set to real-time (i.e. 1/frame rate), slower than real-time, or faster than real-time, depending on the needs of the client playback mechanism. The process cannot transmit frames from the future, so a faster-than-real-time transmission process will eventually starve itself of frames to transmit. In this scenario, a re-try mechanism is put in place to continue the transmission process.

The delivery of near-term real-time recorded video process can run in two modes: a first mode maps and transfers only those frames that are included within a precise desired search time range (e.g., map and transfer frames from ten seconds ago to a time of "now", where a time of "now" is a snapshot of the current time). A second mode is a bit more complex (referred to as an "auto-continuation" mode). In auto-continuation mode, the process will continually map, encapsulate, and transmit frames toward a time of "now." In other words, the process of mapping, encapsulating, and transmitting frames is able to stay just behind the "live" video in time toward the time of "now." The process can do this indefinitely until the client or requestor decides to terminate the request and transmission of frames.

The Byte Stream Server 102 handles http requests from external devices, requesting frames in a specific time range from a unique source. In one embodiment the Byte Stream Server 102 is an http server, and the request URL is constructed as follows: http://server_ip_addr/vmsapi/bss/uuid=<uuid>:subcam=<subcam>:starttime=<StartTime>:endtime=<EndTime>:iframeonly=<0:1>:rate=<txrateinmsecs>:autocontinue=<0:1>:addCompType=<0:1>.

The front end of the BSS 102 server, which accepts the connection request, can parse an optional parameter called "addCompType." This process maintains backward compatibility with legacy clients currently using the BSS for H.264 and is constructed as follows: http://server_ip_addr/vmsapi/bss/uuid=<uuid>:          subcam=<subcam>:starttime=<StartTime>:endtime=<EndTime>:iframeonly=<0:1>:rate=<txrateinmsecs>:autocontinue=<0:1>:addCompType=<0:1>.

If "addCompType" is not provided, or if it provided but set to 0, the BSS encapsulation header will not include a compression type. If addCompType is provided and set to 1, then Compression Type (H.264=1, H.265/HEVC=2) will be included in the BSS encapsulation header.

In another embodiment, the Byte Stream Server 102 encapsulation header further includes an optional compression type, so the external client can determine (on a frame-by-frame basis) what compression type was used for each video frame being transmitted (the client sets up a play-back pipeline, including a decoder, based on the compression type). The CompressionType can be an eight byte value that resides in the BSS 102 header after an eight byte SubCam Number, but before an eight byte Width value.

For requests handled by the BSS 102, the BSS 102 will create and execute a "client worker thread" (CWT) 202 (collectively referred to as CWT's 202. Each CWT 202 is unique to each specific request and handles the search, frame mapping/encapsulation, and transmission for that specific request only. The client worker thread terminator 203 handles the termination and clean-up of all the CWTs 202, when the CWTs are finished with their specific work.

The time-based file search engine 204 (also referred to as Search Engine 204) in response to a request in a time search range or a starting time in a continuous search, locates the files in the range, and provides an ascending time ordered list of files. The actual frames within the time range are located within the files, and usually not from file beginning to end (i.e., the desired frames are located somewhere in the middle of the file(s) with respect to time).

There is one instance of the search engine 204 for each CWT 202. The search engine 204 determines the file list that represents the video frames for the requested search range (Start Time to End Time). However, when the byte stream server 10 is in the auto-continuation mode, once all the frames are delivered by the CWT 202 for the initial search range, the CWT 202 will automatically issue additional searches, using new instances of the search engine. So, a CWT 202 can use sequences of search engines 204 to complete its work. However, only one instance of the search engine is active at any one time for each CWT 202. Once a search engine 204 has accomplished its work, the search object instance is deleted.

When a search is performed by each CWT 202 to locate the video files including the desired time range, the target video frames are almost always going to be contained somewhere in the middle of one or more of these files (i.e. not at the very start of the first file and not always to the very end of the last file). The search engine 204 must locate the video files in range, and then the precise video frames within the video files for ultimate encapsulation and transmission. The video frames within the video files, ultimately representing the start time and end time range, are located using the file time (file name is actually based on time—generally second resolution), offset with the presentation timestamp (generally millisecond resolution) for each frame. The PTS for each frame is captured during the recording cycle in the metadata which accompanies each recorded video file. The key here is that the captured PTS is zero based for the first frame within each recorded file. This trimming process is applied to the beginning of the file sequence (head of the first file in time range sequence) as well as to the end file (tail of the last file in time range sequence).

The time-based search engine 204 accepts a start and end time range in Coordinated Universal Time (UTC), a unique stream UUID, and a subcam number to locate all recorded media files and their associated metadata files within the time range request. The time-based search engine 204 will output a list of file names in ascending time order, representing video found within the time based search range. The ascending time order allows the BSS trimming process (in the file frame mapper-indexer 206) to work efficiently. The UTC file names and time-based directory structures, along with the metadata for each file, allows the file frame mapper-indexer 206 to trim the search results (i.e., find the exact video frames within the target video files associated with the start and end time search). The start and end time values are generally also in UTC time. The metadata index data provides the time offset within each video file for every frame recorded into each video file. This time offset data allows the file frame mapper-indexer 206 to trim down to exact video frame locations.

The File Frame Mapper-Indexer 206 (also referred to as the mapper 206 or Frame Mapper-Indexer 206) receives the files provided by the search engine and creates a frame map or frame vector. The frame map is an array or vector for each frame (array of frames) and is used by the encapsulater 208 component (in each CWT) to transmit frames. The mapper 206 creates a vector of frames, precisely mapped (using a trimming process with respect to the search results) to the start and end time. The precise mapping is done with respect to the PTS values provided for each frame. In one embodiment the file frame mapper-indexer 206 identifies and maps the requested range of frames for transmission. During a recording cycle, a frame index file is created. This index file is updated in real-time, as the frames arrive to be recorded, and includes the frame type (e.g., I, P, B, frames) offset (byte write offset in the file), size in bytes of each video frame, and the timing information required to play back the video frame (e.g., Presentation Time Stamp—PTS using H.264 notation). In essence, the recording creation process includes the actual video recording file (e.g., an mp4 file container) and the associated index file.

In one embodiment the format being used to encapsulate each video frame for transmission of encapsulated frames includes the following fields:

---

Variable Length of Private Boundary Delimiter

8 Byte Start Code
36 Character String of UUID
8 Byte Subcam Number
8 Byte Width
8 Byte Height
8 Byte Frame Rate
8 Byte Frame Type (1 = IFrame, 2 = PFrame, 3 = BFrame)
8 Byte Frame Number in Sequence
8 Byte Total Number of Frames to be Transmitted
8 Byte First PTS Value in Sequence
8 Byte Last PTS Value in Sequence
8 Byte PTS Value for this Frame
8 Byte ExtraDataSize (sps/pps)
ExtraData of Size ExtraDataSize 8 Byte VideoFrameSize
Video Frame of size VideoFrameSize 8 Byte Stop Code

---

The ExtraData in the BSS 102 header can include VPS—Video parameter set; SPS—Sequence parameter set; PPS—Picture parameter set for H.265/HEVC. H.264 only receives SPS/PPS. This is part of the extradatablock standards for the two individual codecs.

For each frame written (or, more accurately, muxed) to the recording file, an index entry is added to the index file associated with the recording file. The format of the index entry is:

FrameType_Byteoffset_FrameSize_PlaybackTimeStamp.
The frame mapper/indexer will use this information to create an array or vector of the frames based on the time-based search range. These frames are encapsulated and transmitted via TCP/IP to the client.

In one embodiment, the Frame Mapper-Indexer 206 receives the start and end time of the search, as well as the complete list of files (i.e. search results) from the Search Subsystem, which includes the accompanying metadata index files for each recording file. The Frame Mapper-Indexer 206 uses the metadata indexing data, which specifies frame type, write byte offset into the file, frame size, and presentation time stamp for each frame, to trim the frame list within range to the video frames exactly representing the range within start and end times. Again, the search subsystem does not locate exact frames. It only locates files representing frames within a search range. It is the responsibility of the Frame Mapper-Indexer 206 to take the file list and produce an array or vector of the precise time-based video frames that represent the range of start and end time. All of these precise time-based video frames are ultimately transmitted to satisfy the time-based request from an external client to the BSS 102. The Frame Mapper-Indexer 206 produces a vector of frames that will be encapsulated (using the BSS encapsulation header information described above) by the encapsulator 208, and transmitted by the BSS client worker thread 202.

In one embodiment, the video recorder engine 220 records received video to files and creates a frame index mapping file that is used by the Byte Stream Server 102 and associated components to deliver the appropriate frames upon request. In this embodiment, a database is not used to store and retrieve index data for the file frame mapper-indexer 206. Instead index data is stored in metadata files which accompany each recording. This embodiment solution leverages the efficiencies in the systems file system. File index data is written out (flushed) to file at a rate corresponding with the original video source's frame rate. In one embodiment, the Live Video Feed (e.g., RTSP/RTP based H.264) is compressed from an IP-based source.

The BSS 102 can map all the way back to the earliest time for any camera source that has been recorded. In one embodiment the smallest time back is one second. The indexing metadata writes (flushes to disk) are driven off each camera source's frame rate, and this index data is being flushed to the meta-index file in one second chunks. For example, if a camera source is 30 frames per second, the index file will get 30 entries flushed to it in one second. If the camera is configured to produce one frame per second, the index file will get one entry flushed to it in that same one second time. Entries could be flushed more frequently than one second, and put more demands on the file-disk I/O subsystem, but it is not generally necessary. In certain embodiments, one second is somewhat aggressive, but the timing is adjustable in the video recording engine 220. The BSS 102 provides the ability for a security officer, for example, to click on an event (e.g., associated with a door being accessed) and immediately play the video associated with the event. It's unlikely an individual can see an event and click on it via a user interface (UI) within one second. However, one reason for the selection of one second is that it is envisioned that a system being configured to automatically react to and selecting video for playback associated with an event faster than a human can do it though a UI. Even in this case, one second past access seems generally adequate for most security applications.

The video recording engine 220 is responsible for connecting to and managing connections to IP-based surveillance cameras (e.g. via RTSP/RTP/UDP or TCP). This includes receiving and ultimately recording (appropriately muxing and writing video frames to a file container—using mp4 in one embodiment). The way this subsystem feeds into the BSS 102 is in the metadata generated for each recording file, as well as in recording file names and directory structures used to actually write out the recorded video. Again, a database is not used to hold any of this information. The file names and directory structures are generated using UTC time, and the files reside on the disk in the following format: yyyy/mm/dd/hh/, where yyyy=year, mm=zero-based month, dd=day, and hh=hour. The video frames themselves are muxed into the mp4 container, and the container name is generated as mmss_UUID_subcam.mp4, where mm=minute, ss=second, UUID=unique to each camera, subcam=specifies the sub camera number for the camera, as many IP-based cameras offer more than one camera view, typically through separate lenses. Complete with the recorded file, residing in its appropriated time-based recording directory structure and using the appropriate time-based file name, is an accompanying metadata file. For example, if live video is recording in 2017/08/15/14/4045_UUID_0.mp4, then the corresponding metadata is being generated in 2017/08/15/14/4045_UUID_0.mp4.idx1. Note that generally a file extension of idx1 is used. The same file name base is used for the metadata files to allow the time-based search engine 204 to easily associate recorded file containers with their metadata.

The BSS 102 differentiates between the frame types using the Network Abstraction Layer (NAL) types in the compressed video bit stream during the recording cycle. When the video is being recorded and the index map is created, this includes for each frame the byte offset in the recorded file container, frame size, frame type, and presentation timestamp. The recorded video can include all video frames, or only I-frames/Keyframes. The frame types for H.264, H.265, or MPEG-4 are I (Intra-frame), P (Predicted), and B (Bidirectional). The HEVC/H.265 standard is also supported. When the file frame mapper-indexer 206 and frame encapsulater 208 are requested to deliver only I-frames, it can discard all those frames within the time search range that are not the I-frame type (i.e., discard the P and B frames). The client decoder (not shown) can decode I-frames by themselves, without referencing any other frames, as long as the extra-data-block (SPS/PPS for H.264, SPS/PPS/VPS for H.265) is provided (which is encapsulated and sent by the BSS as part of the encapsulation header). It is understood that with a compression type such as MJPEG, all frames are I-frames. For this recorded compression type, I-frame only mode request would be accompanied by a frequency parameter for frame inclusion (i.e. all frames, every other frame, every third frame, etc). It is possible to send only P frames or B-frames for H.264, H.265, and MPEG-4, but this would not be useful to end client decoder without the accompanying I-frame (and Is and Ps in the case of B frames) for decoding.

It should also be noted that, for compressed video types that contain multiple frame types, not only can the architecture deliver I-frame only, but it can deliver I-frames at a frequency corresponding to an integer multiple of the original source's I-frame interval or Group of Pictures (GOP) size. For example, if the original recorded source is 30 frames per second with a GOP size of 30 (i.e. I-frame every 1 second), the frames delivered in the I-frame only delivery mode can represent one frame per second, or one frame every two seconds, etc, by discarding I-frames in order to deliver the desired I-frame frequency. In other words, we can discard I-frames at a set rate in the I-frame only delivery mode. Also note that importance of the statement that this I-frame frequency must be an integer multiple of the I-frame frequency of the original recorded source. The BSS 102 neither provides video transcoding nor trans-rating pipeline in the BSS, which would be required to deliver an I-frame mode that is not an integer multiple of the original GOP size. Other than in I-frame only transmission mode, the solution is agnostic with regards to frame types. The frame type is used is during the encapsulation of each frame in the transmission sequence. Frame type is also useful within the playback client to reconstruct the stream for decoding, if desired.

No special hardware or operating system (OS) is required to deliver of near-term real-time recorded video. However, faster CPUs and faster disk I/O subsystems will perform better and allow more BSS stream access concurrency. System Activity Monitoring/Reporting (SAR) testing on the BSS 102 indicates that the CPU and disk I/O load on the BSS 102 is quite low for both the metadata generation required during the recording cycle, as well as the disk access during the BSS stream access. Also, unlike a traditional media streaming server, the simultaneous access count to the BSS 102 is not expected to be very high.

The BSS server is not a conventional video server (e.g., Video On Demand (VOD) server and other streaming live media servers). It is a specific architecture, design, and implementation put together to satisfy an instant replay (or instant playback) feature within a video recording server, without having to buffer video streams, which is prohibitively expensive (with regards to memory). The request and transmission by the BSS could represent a "live stream" of the recorded source, delayed by a small amount of time (typically between 1-2 seconds). However, the BSS 102 is optimized to function as an instant replay server, in contrast to a "live streaming" server.

Figure 3:
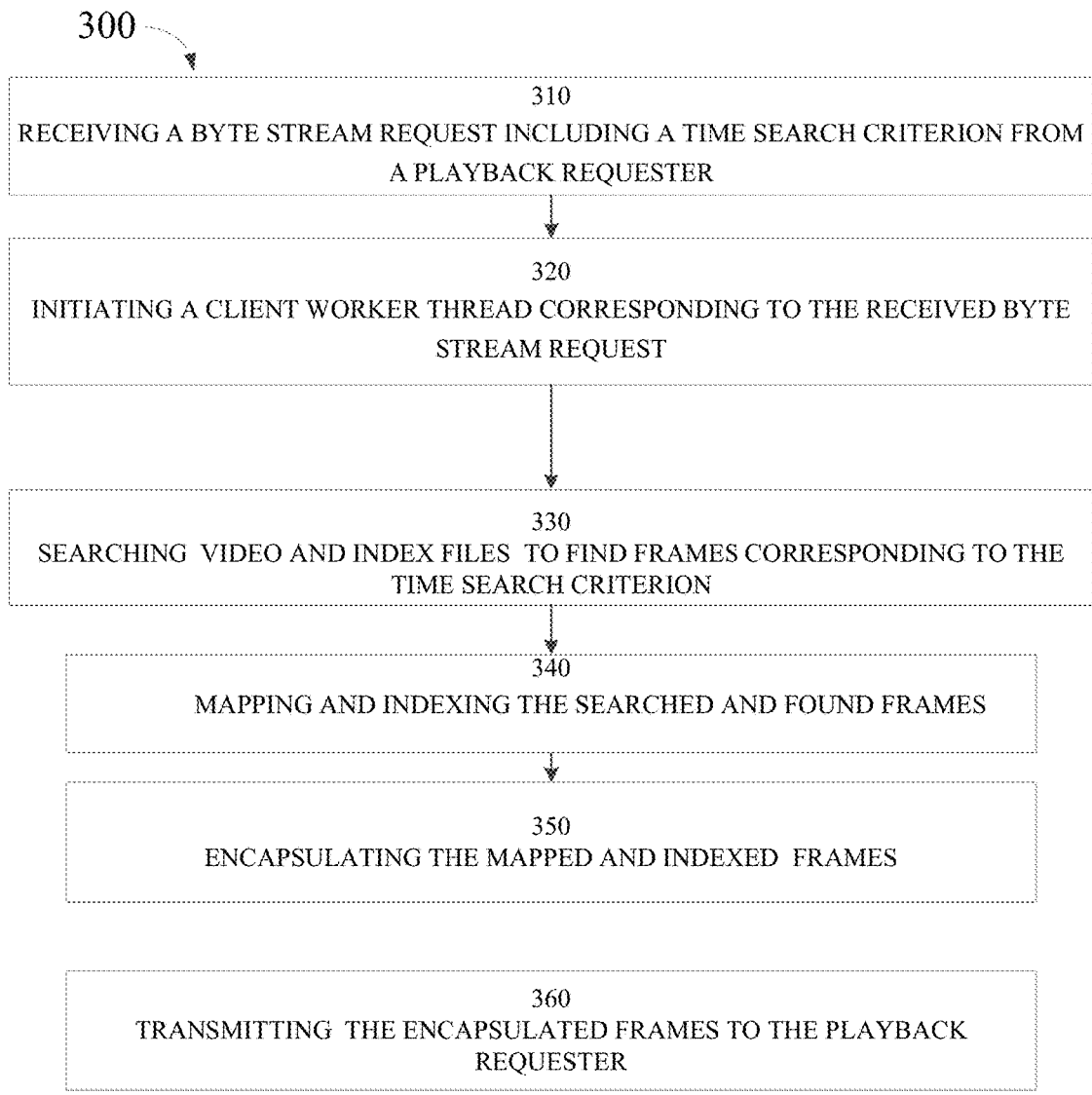
FIG. 3 is a flow diagram illustrating the steps to deliver near-term real-time recorded video from the byte stream server of FIG. 2.

Turning now to FIG. 3 in which like reference numbers refer to like elements of FIGS. 1 and 2 a flow diagram illustrates a process for delivery of near term, real-time recorded video. In the flow diagram of FIG. 3 the rectangular elements are herein denoted "processing blocks" (typified by step 310 in FIG. 3) and represent computer software instructions or groups of instructions. The diamond shaped elements in the flow diagrams are herein denoted "decision blocks" and represent computer software instructions or groups of instructions which affect the operation of the processing blocks, Alternatively, the processing blocks represent steps performed by functionally equivalent circuits such as a digital signal processor circuit or an application specific integrated circuit (ASIC). It will be appreciated by those of ordinary skill in the art that some of the steps described in the flow diagrams may be implemented via computer software while others may be implemented in a different manner (e.g. via an empirical procedure). The flow diagrams do not depict the syntax of any particular programming language. Rather, the flow diagrams illustrate the functional information used to generate computer software to perform the required processing. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention.

As described below, steps 310-360 generally occur on the BSS 102. The process commences in step 310 when a byte stream request including a time search criterion from a playback requester is received. In step 320, a client worker thread 202 corresponding to the received byte stream request in initiated by the BSS 102. In step 330 video and index file storage system 210 are searched to find frames corresponding to the time search criterion. Searching a set of video and accompanying index file includes searching index file metadata. In step 340, the searched and found frames are mapped and indexed. In step 350, the mapped and indexed frames are encapsulated and finally the in step 360 the encapsulated frames are the transmitted to the playback requester. When operating in a continuous search mode, the CWT 202 continuously provides encapsulated frames to the client requestor.

All publications and references cited herein are expressly incorporated herein by reference in their entirety. Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A system for delivery of near-term real-time recorded video comprising:
    a byte stream server having a network interface;
    plurality of client worker threads coupled to the byte stream server;
    a time-based file search engine coupled to the plurality of client worker threads;
    at least one file frame mapper-indexer coupled to the plurality of client worker threads;
    a disk based video and index file storage system for directly storing video and index files to disk and coupled to the at least one file frame mapper-indexer, wherein the index files include timing information for video frame playback from recorded video;
    an encapsulater coupled to the at least one file frame mapper-indexer and the disk based video and index file storage system, wherein the encapsulater includes a present time stamp values, in at least one encapsulated frame and combines at least one non-buffered, non-cached video frames directly from the disk based video and index file storage system and index data from the index files into the at least one encapsulated frame; and
    a client playback subsystem coupled to the plurality of client worker threads and to the network interface, wherein the system provides near-term real time playback of recorded video including recorded video from a plurality of camera feeds actively being recorded;
    wherein the plurality of client worker threads are locally coupled to the time based search engine, the encapsulater, and the byte stream server; and
    a user interface, (UI) coupled to the plurality of client worker threads, wherein the system provides an instant replay of any one of the plurality of camera feeds.

2. The system of claim 1, further comprising a video recording engine coupled to the disk based video and index file storage system.

3. The system of claim 2, wherein the video recording engine is adapted to receive at least one video stream.

4. The system of claim 3, wherein the at least one video stream comprises at least one live video feed compressed from an IP-based video source.

5. The system of claim 1, wherein the at least one live video feed originates from crowd sourced video.

6. The system of claim 1, wherein a near-term delay between live video and transmission of encapsulated recorded video frames is less than two seconds while the camera feeds are actively being recorded.

7. The system of claim 1, wherein frame mapper-indexer and frame encapsulater deliver only I-frames.

8. The system of claim 7, wherein frame mapper-indexer and frame encapsulater deliver I-frames at a frequency corresponding to an integer multiple of the original source's I-frame interval.

9. A computer-implemented method to deliver near-term real-time recorded video comprising:
    receiving via a byte stream server a byte stream request including a time search criterion from a playback requester;
    initiating a client worker thread corresponding to the received byte stream request, wherein the client worker thread is locally coupled to the byte stream server;
    recording non-buffered, non-cached video frames directly to a disk based video and index file storage system and generating at least one index file;
    searching non-buffered, non-cached recorded video and the at least one index file to find frames corresponding to the requested time search criterion, wherein finding frames uses a time based search engine locally coupled to the client worker thread;
    mapping the recorded, searched and found non-buffered video frames, wherein mapping includes creation of the frame mapping index vector which provides the indexing into the actively recorded non-buffered, non-cached video frames;
    encapsulating the mapped, recorded, searched and found non-buffered, video frames, wherein an encapsulated frame includes a presentation timestamp and a frame type, wherein encapsulation uses an encapsulater locally coupled to the disk based video and index file storage system;
    transmitting the encapsulated recorded searched and found non-buffered video frames to the playback requester; and
    instantly replaying video from the encapsulated recorded searched and found non-buffered video frames to the playback requester.

10. The method of claim 9, wherein the time search criterion comprises a time range.

11. The method of claim 9, wherein the time search criterion comprises specifying an auto-continuation mode to continually map and transmit frames from a start time.

12. The method of claim 11, further comprising playing back video from the start time at a faster than real time rate to stay just behind live video.

13. The method of claim 9 further comprising recording a video frame in the disk based video and index file storage system.

14. The method of claim 9 further comprising recording a frame index entry in the disk based video and index file storage system.

15. The method of claim 9, wherein searching video and index file storage system to find frames comprises generating an array of frames corresponding to a search criterion.

16. The method of claim 9 further comprising throttling the transmission of the encapsulated, searched and found frames to the playback requester.

17. The method of claim 16, wherein throttling the transmission of encapsulated frames to the playback requester comprises one of:
    transmitting the encapsulated, recorded, searched and found frames in real-time;
    transmitting the encapsulated recorded, frames faster than real-time; and
    wherein the transmission of encapsulated recorded, searched and found frames occurs in less than two seconds of the real time recording of the frames while actively recording the non-buffered video frames and generating the at least one index file.

18. The method of claim 9, further comprising playing back the encapsulated frames using the presentation time stamp values in the encapsulated frames.

19. The method of claim 9, further comprising delivering only I-frames at a frequency corresponding to an integer multiple of the original source's I-frame interval.

20. A computer-readable non-transitory storage medium having instructions stored thereon for processing data information, such that the instructions, when carried out by a processing device, enable the processing device to perform operations of:

receiving a byte stream request including a time search criterion from a playback requester;

initiating a client worker thread corresponding to the received byte stream request;

recording non-buffered video frames and generating at least one index file;

searching non-buffered recorded video frames and at least on index file to find frames corresponding to the requested time search criterion, wherein finding frames uses a time based file search engine locally coupled to the client worker thread;

mapping and encapsulating the searched and found non-buffered video frames, wherein mapping includes creation of the frame mapping index vector which provides the indexing into the actively recorded non-buffered video frames, wherein encapsulation uses an encapsulater locally coupled to the disk based video and index file storage system to encapsulate the recorded non-buffered video frames and mapping uses a file frame mapper indexer locally coupled to the encapsulater to generate at least one frame map; and transmitting the encapsulated, searched and found non-buffered video frames to the playback requester; and instantly replaying video from the encapsulated recorded searched and found non-buffered, non-cached video frames to the playback requester.

\* \* \* \* \*